US012768728B2

(12) United States Patent
Ji et al.

(10) Patent No.: US 12,768,728 B2
(45) Date of Patent: Oct. 20, 2026

(54) AUTOMATIC CALIBRATION FOR BACKSCATTERING-BASED DISTRIBUTED TEMPERATURE SENSOR

(71) Applicant: NEC Laboratories America, Inc., Princeton, NJ (US)

(72) Inventors: Philip Ji, Cranbury, NJ (US); Ting Wang, West Windsor, NJ (US); Yaowen Li, Princeton, NJ (US); Junqiang Hu, Davis, CA (US); Shuji Murakami, Monmouth Junction, NJ (US); Jian Fang, Princeton, NJ (US)

(73) Assignee: NEC Corporation (JP)

( * ) Notice: Subject to any disclaimer, the term of this patent is extended or adjusted under 35 U.S.C. 154(b) by 282 days.

(21) Appl. No.: 18/598,386

(22) Filed: Mar. 7, 2024

(65) Prior Publication Data

US 2024/0302225 A1 Sep. 12, 2024

Related U.S. Application Data

(60) Provisional application No. 63/488,819, filed on Mar. 7, 2023.

(51) Int. Cl.
*G01K 15/00* (2006.01)
*G01K 11/32* (2021.01)

(52) U.S. Cl.
CPC ............ *G01K 15/005* (2013.01); *G01K 11/32* (2013.01)

(58) Field of Classification Search
None
See application file for complete search history.

(56) References Cited

U.S. PATENT DOCUMENTS 10,880,007 B1 * 12/2020 Hveding ............ G02B 6/29361

* cited by examiner

*Primary Examiner* — Erica S Lin
(74) *Attorney, Agent, or Firm* — Vincent Duffy

(57) ABSTRACT

Disclosed are vehicle-infrastructure interaction systems and methods employing a distributed fiber optic sensing (DFOS) system operating with pre-deployed fiber-optic telecommunication cables buried alongside/proximate to highways/roadways which provide 24/7 continuous information stream of vehicle traffic at multiple sites; only require a single optical sensor cable that senses/monitors multiple locations of interest and multiple lanes of traffic; the single optical sensor cable measures multiple related information (multi-parameters) about a vehicle, including driving speed, wheelbase, number of axles, tire pressure, and others, that can be used to derive secondary information such as weight-in-motion; and overall information about a fleet of vehicles, such as traffic congestion or traffic-cargo volume. Different from merely traffic counts, our approach can provide the count grouped by vehicle-types and cargo weights. Precise measurements are facilitated by high temporal sampling rates of the distributed acoustic sensing and a dedicated peak finding algorithm for extracting the timing information reliably.

12 Claims, 9 Drawing Sheets

Option 1: 2 sensors use separate fibers in the same cable

AUTOMATIC CALIBRATION FOR BACKSCATTERING-BASED DISTRIBUTED TEMPERATURE SENSOR

CROSS-REFERENCE TO RELATED APPLICATIONS

This application claims the benefit of U.S. Provisional Patent Application Ser. No. 63/488,819 filed Mar. 7, 2023, the entire contents of which is incorporated by reference as if set forth at length herein.

FIELD OF THE INVENTION

This application relates generally to distributed fiber optic sensing (DFOS) systems, methods, structures, and related technologies. More particularly, it pertains to the automatic calibration for backscattering-based distributed temperature sensing (DTS).

BACKGROUND OF THE INVENTION

Distributed fiber optic sensing (DFOS) systems, methods, and structures—including distributed temperature sensing (DTS) have found widespread utility in contemporary industry and society. Given such utility and subsequent importance, techniques that provide the automatic calibration of DFOS/DTS would represent a welcome addition to the art.

SUMMARY OF THE INVENTION

An advance in the art is made according to aspects of the present disclosure that provides automatic calibration for backscattering-based distributed fiber optic sensing/distributed temperature sensing (DFOS/DTS) that employs an optical sensor fiber.

In sharp contrast to the prior art, DFOS/DTS systems and methods according to aspects of the present disclosure employ distributed fiber optic sensing/distributed vibration sensing (DFOS/DVS), to obtain objective temperature measurements at measurement points along the length of the optical sensor fiber and the temperature measurements so obtained are then used to calibrate DFOS/DTS temperature measurements. Advantageously, systems and methods according to the present disclosure do not require double end measurement, do not affect the measurement speed or the noise level, and do not require an additional wired data transmission network or a wireless communication network to convey calibration data to detection/analysis systems.

Operationally, systems and methods according to the present disclosure employ temperature sensors and acoustic modulators that are located at a plurality of calibration points along the optical sensor fiber. The temperature sensors measure calibration temperatures at those calibration points and the acoustic modulators apply mechanical vibrations to the optical sensor fiber indicative of the measured calibration temperatures. The mechanical vibrations are detected/analyzed by a DFOS/DVS system and the measured calibration temperatures are determined. The calibration temperatures so determined are then employed to calibrate DFOS/DTS temperature measurements.

As we shall show and describe further, according to aspects of the present disclosure, objectively measured temperature information at temperature measurement points is transmitted digitally to the DFOS/DVS interrogator/analyzer in real-time using the DFOS/DVS techniques. As a result, a sensor optical fiber/cable used for the temperature sensing is also used to transmit calibration temperature information. The temperature information conveyed via DVS is demodulated at the DFOS/DVS interrogator/analyzer location (i.e., the CO), and subsequently used for DTS calibration.

According to an aspect of the present disclosure, a fiber optic vibration-based transmitter and receiver ("acoustic modem") is employed to send the temperature information digitally from locations along the sensor fiber, back to the interrogator/analyzer, thereby eliminating need for an additional wired or wireless network, while not affecting DFOS sensing distances and times, in sharp contrast to double-end operation.

According to still another aspect of the present disclosure, the acoustic modems are positioned at appropriate calibration locations, and optional temperature/vibration sensing-switching operations are performed to switch between temperature calibration measurement determination and temperature determination using the calibration temperatures.

BRIEF DESCRIPTION OF THE DRAWING

FIG. 5(A), FIG. 5(B), and FIG. 5(C) are schematic block diagrams showing illustrative automatic DFOS/DTS calibration and temperature measurement according to aspects of the present disclosure in which: FIG. 5(A) shows 2 sensors using separate fibers in the same fiber optic cable; FIG. 5(B) shows switching to share fiber between DTS and distributed vibration sensing/distributed acoustic sensing (DVS/DAS); and FIG. 5(C) shows a use of hybrid DFOS; all according to aspects of the present disclosure.

DETAILED DESCRIPTION OF THE INVENTION

Figure 1A:
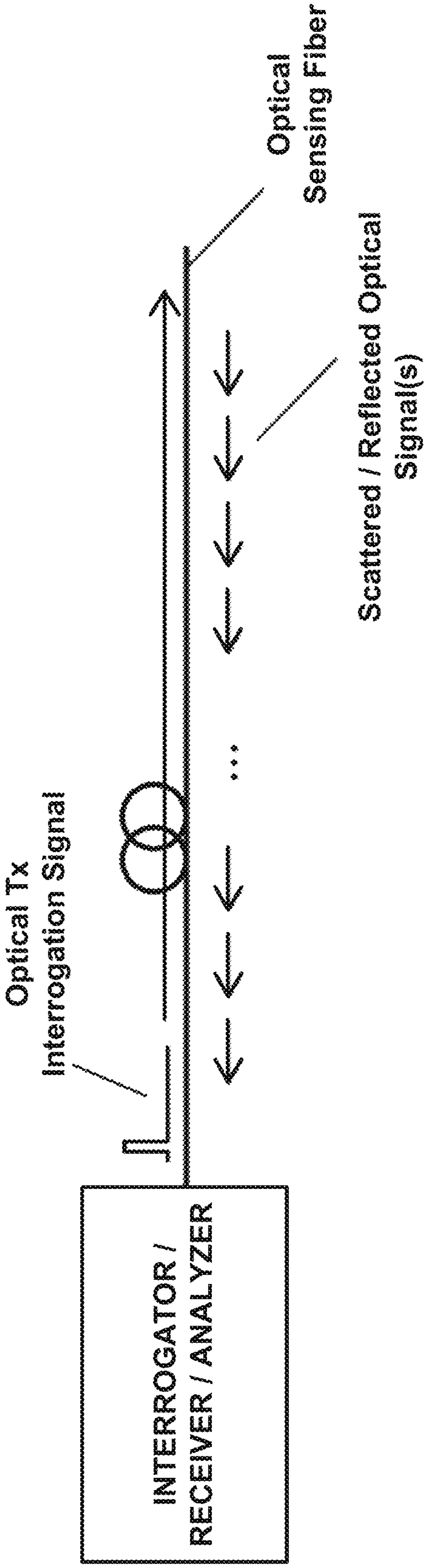
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
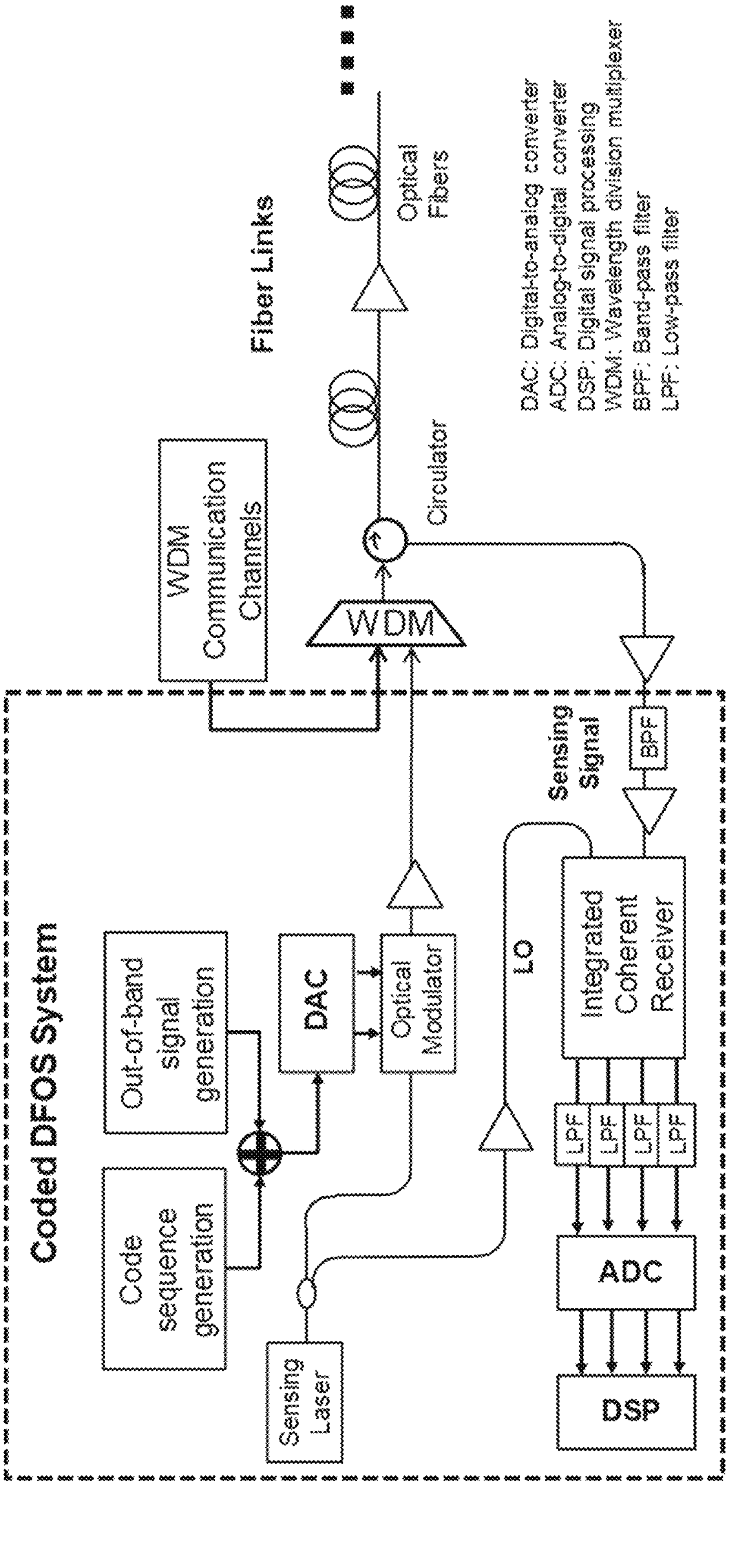

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Of particular interest, distributed temperature sensing (DTS) is a technology that uses fiber optic cables as linear temperature sensors. Unlike traditional point sensors, which measure temperature at discrete locations, DTS can provide a continuous temperature profile along the entire length of the cable. This makes it ideal for applications where it's important to monitor temperature changes over a large area or distance, such as:

Oil and gas pipelines: DTS can be used to detect leaks or blockages in pipelines by monitoring for changes in temperature.

Power cables: DTS can be used to monitor the temperature of power cables to prevent overheating and ensure efficient operation.

Buildings: DTS can be used to monitor the temperature of building walls, floors, and ceilings for energy efficiency purposes.

Geothermal applications: DTS can be used to monitor the temperature of wells and boreholes in geothermal energy applications.

As noted above, DTS operation is relatively straightforward.

A laser pulse is sent through the fiber optic sensor cable.

As the light pulse travels through the cable, it interacts with the molecules of the fiber optic material. This interaction causes some of the light to scatter back in the direction of the source.

The intensity and wavelength of the backscattered light are affected by the temperature of the fiber optic cable at the point where the scattering occurred.

By analyzing the intensity and wavelength of the backscattered light, the DTS system can determine the temperature at each point along the fiber optic cable.

DTS systems offer several advantages over traditional point sensors, including: High spatial resolution: DTS systems can measure temperature with a spatial resolution of less than a meter; Long distances: DTS systems can monitor temperature over long distances, up to several kilometers; Continuous monitoring: DTS systems provide a continuous temperature profile, which allows for better detection of trends and anomalies; and Durability: Fiber optic cables are resistant to harsh environments and can withstand high temperatures.

Distributed vibration sensing (DVS), also sometimes known as distributed acoustic sensing (DAS), is a technology that uses optical fibers as widespread vibration and acoustic wave detectors. Like distributed temperature sensing (DTS), DVS allows for continuous monitoring over long distances, but instead of measuring temperature, it measures vibrations and sounds along the fiber.

DVS operates as follows.

Light pulses are sent through the fiber optic sensor cable.

As the light travels through the cable, vibrations and sounds cause the fiber to stretch and contract slightly.

These tiny changes in the fiber's length affect how the light interacts with the material, causing a shift in the backscattered light's frequency.

By analyzing the frequency shift of the backscattered light, the DVS system can determine the location and intensity of the vibrations or sounds along the fiber optic cable.

Similar to DTS, DVS offers several advantages over traditional point-based vibration sensors: High spatial resolution: It can measure vibrations with high granularity, pinpointing the exact location of the source along the cable; Long distances: It can monitor vibrations over large areas, covering several kilometers with a single fiber optic sensor cable; Continuous monitoring: It provides a continuous picture of vibration activity, allowing for better detection of anomalies and trends; Immune to electromagnetic interference (EMI): Fiber optic cables are not affected by electrical noise, making them suitable for use in environments with strong electromagnetic fields.

DVS technology has a wide range of applications, including: Structural health monitoring: Monitoring bridges, buildings, and other structures for damage or safety concerns; Pipeline monitoring: Detecting leaks, blockages, and other anomalies in pipelines for oil, gas, and other fluids; Perimeter security: Detecting intrusions and other activities along fences, pipelines, or other borders; Geophysics: Studying seismic activity, landslides, and other geological phenomena; and Machine health monitoring: Monitoring the health of machinery by detecting abnormal vibrations indicative of potential problems.

As the technology continues to develop, DVS is expected to become even more widely used in various fields where continuous and sensitive vibration monitoring is crucial.

As noted, DFOS can employ different types of optical backscattering. The most common type is the Raman backscattering.

When an optical signal (such as a laser pulse) is sent into the fibers, the interaction between the incident light (photons) and the transmission medium (i.e. the optical sensor fiber) causes Raman scattering, which arises from differences in molecular vibration and rotation energy levels of the $SiO_2$ and $GeO_2$. This is an "inelastic" response therefore the wavelength of the Raman scattering is different from the incident light.

The Raman scattering light includes Stokes Raman scattering (atom or molecule absorbs energy, therefore scattered photo has less energy than the incident photon) and anti-Stokes Raman scattering (atom or molecule loses energy, therefore scattered photon has more energy than the incident photon).

Stokes and Anti-Stokes components have longer, and shorter wavelengths as compared to the incident light, respectively. Part of the Raman scattering light travels back to the source, therefore it is generally called the Raman backscattering.

Raman-based DTS measures the intensity of the two components of the Raman backscattering $P_s$ and $P_{as}$ at each location z, and calculate the temperature at the location T(z) using the following formula:

$$T(z) = \frac{\gamma}{\ln\frac{P_s(z)}{P_{as}(z)} + C - \Delta\alpha Z}$$

There are 3 coefficients in this equation, namely C, γ, and Δα. These 3 parameters need to be determined so that the temperature can be calculated. This determination is part of the system calibration process that is the subject of the present disclosure.

Ideally, three known temperature points are required to perform the calibration to obtain values for the three parameters. In practice, to eliminate noise in the measurement data, usually a continuous section of sensor fiber, such as a coil of sensor fiber, is used for each measurement point. Such coils of sensor fiber are sometimes referred as "temperature calibration zones". We note that in this disclosure, "point" and "zone" are used interchangeably.

Two temperature baths can be located close to the sensor instrument, and a third one should be close to the end of the fiber cable. If the fiber type/characteristic is known and is the same throughout an entire route, two temperature zones would be sufficient for calibration.

In practical cases, if there is more than one section of fiber connected together (such as by splicing or using optical connectors), these parameters will be different from section to section, especially the parameter Aa. Therefore, calibration is required for each section of the sensor fiber.

In other words, two or three known temperature zones are required for each section, preferably including one located at the beginning and another one located at the end of the section. With temperature data determined at these corresponding locations, the 3 parameters for each section can be determined, and the temperature for all sections in the entire measurement/sensor fiber route can in turn be calculated from the measured Raman backscattering signal. Otherwise, if the calibration is only performed at the beginning section of the sensor fiber, the temperature values in the subsequent sections will be incorrect.

Besides Raman backscattering, there are also DTS systems based on Brillouin backscattering or Rayleigh backscattering. The physical principle and the procedures/equations to calculate temperature are different in these types of DTS sensors, however the calibration at each fiber section is also required. Therefore, temperature information at the beginning and end of each section is necessary for DTS operation in Raman/Rayleigh systems.

Known temperature data/information can be easily obtained using discrete temperature sensors/thermometers (such as thermal couplers, thermistors, etc.) These temperature sensors/thermometers are generally low cost, compact, technologically mature, and widely available commercially. However, one challenge with the use of such discrete sensors is how to transmit temperature information produced by the discrete sensors/thermometers from the field to the DTS sensor interrogator, which is oftentimes located at a central office (CO)—away from the measurement field.

Figure 2:
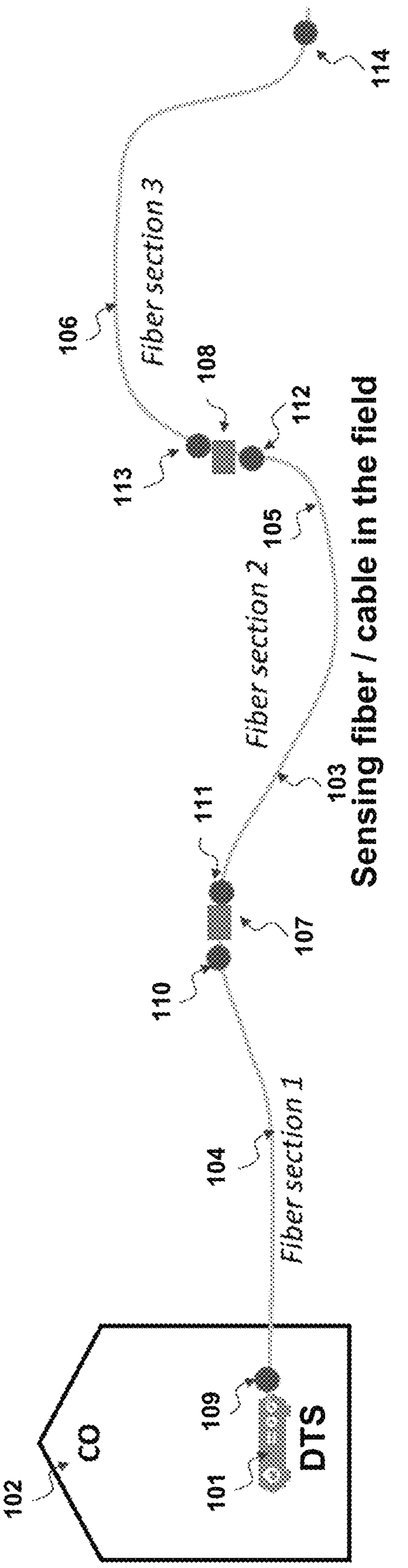
FIG. 2 is a schematic block diagram showing illustrative distributed fiber optic temperature sensing (DFOS/DTS) with multiple sections of sensing fiber according to aspects of the present disclosure.

FIG. 2 is a schematic block diagram showing illustrative distributed fiber optic temperature sensing (DFOS/DTS) with multiple sections of sensing fiber according to aspects of the present disclosure. As illustratively shown in this figure, the DTS system—including interrogator and analysis systems shown previously 101, is in a Central Office, 102, optically connected to sensor/measurement optical fiber/cable 103 which extends into a field to be sensed.

As illustratively shown further in this figure, there are 3 sections of fiber 104, 105, 106 joined by 2 connection points 107 and 108.

For each section, temperature information at 2 or more calibration points are required, preferably include the beginning and the end of the section [i.e., 109 & 110, 111 & 112, and 113 & 114 respectively]. Among these 6 calibration points illustratively shown in this example, 5 are in the external sensor field [110-114].

One approach to obtain the live temperature at these external calibration points is to add a data transmission network-such as a wired or wireless network—that provides communication between the CO and all calibration location such that temperature information may be provided to the interrogator/sensor system for calibration. As will be readily appreciated, such network may be costly, and possibly not space efficient. Additionally, wireless communications infrastructure may not be available in the remote geographic locations to which a DFOS sensor fiber may be deployed.

Fortunately, there is an optical approach for Raman backscattering based DTS which is to employ a bidirectional operation. In such a system, two optical fibers are used in a fiber optic cable, and at the far end, each are optically connected thereby forming a loopback configuration.

When so configured, the Raman backscattering signals are measured from both ends. With the data from both directions, the term $\Delta\alpha$ is advantageously no longer just a single number, but a function with respect to the location $\Delta\alpha(z)$ for the entire length of the sensor fiber.

Temperature for every location along the length of fiber can be obtained by using the following formula (assuming that the fiber type is the same throughout the entire route):

$$T(z) = \frac{\gamma}{\ln\left(\frac{P_s(z)}{P_{as}(z)}\right)_1 + C - \int_0^z \Delta\alpha'(z')dz'}$$

Using this method, per-section calibration is not required, and the temperature information at the beginning and end of each section is not required. However, there are tradeoffs in this method. First, since the fiber length is effectively doubled, the measurement speed is halved. The needs to measure from both ends further reduces the speed by half. Therefore, the measurement time is much slower. Also, since each sensor has a limited measurement distance capability, the double end operation will reduce the maximum distance by half. Furthermore, measurement noise will increase, even at a near end, making the system less sensitive (higher measurement error).

In this invention, a new solution is proposed. Advantageously, it does not require double end measurement, therefore will not affect the measurement speed or the noise level. It does not require an additional wired data transmission network or a wireless communication network.

As we shall show and describe further, according to aspects of the present disclosure, invention, fiber optic sensing-based devices are placed at calibration points, and the temperature information at those points are transmitted digitally to the sensor in real-time using the DFOS/DVS techniques. As a result, a sensor optical fiber/cable used for the temperature sensing is also used to transmit calibration temperature information. The temperature information conveyed via DVS is demodulated at the sensor location (the CO), and subsequently used for DTS calibration.

According to an aspect of the present disclosure, a fiber optic vibration-based transmitter and receiver ("acoustic modem") is employed to send the temperature information digitally—as mechanical vibrations—from locations along the sensor fiber, back to an interrogator/analyzer, thereby eliminating any need for an additional wired or wireless network, while not affecting DFOS sensing distances and times, in sharp contrast to double-end operation. Note that the mechanical vibrations may be induced in the sensor fiber by physical contact with a mechanically vibrating actuator, or induced by acoustic or sound waves generated from an acoustic generator and directed at the sensor fiber.

Still other inventive aspects of the present disclosure include the placement of acoustic modems at appropriate calibration locations, the automatic calibration procedure, and the optional temperature/vibration sensing switching operation.

Figure 3:
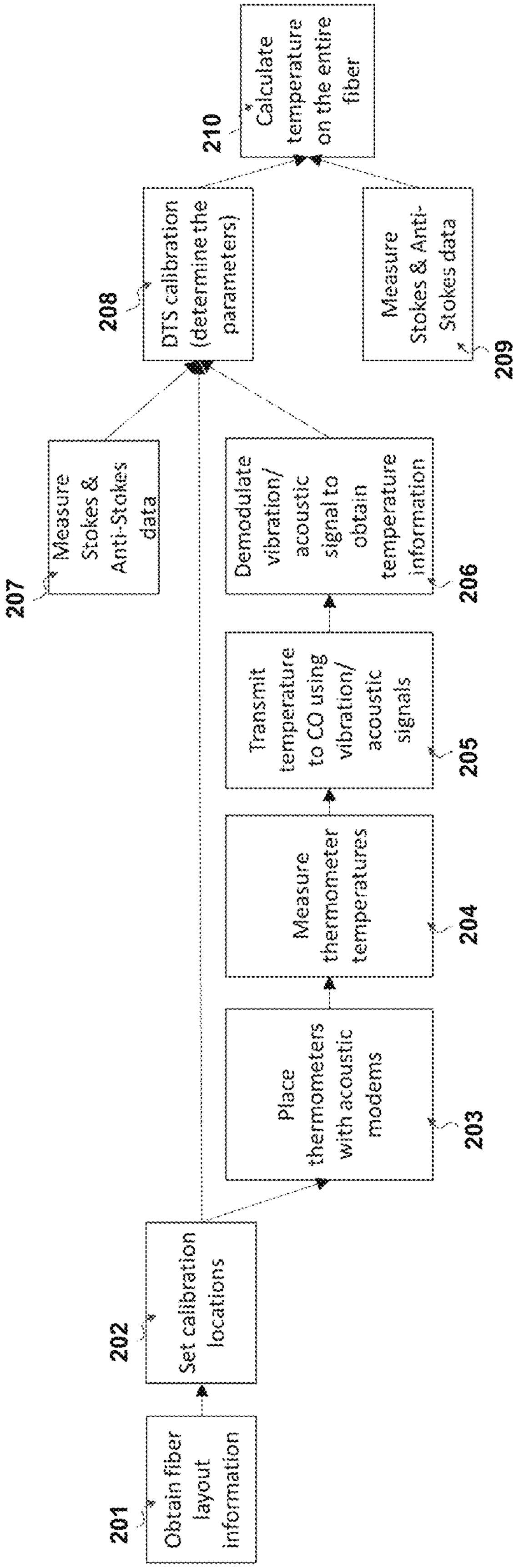
FIG. 3 is a schematic block diagram showing illustrative operational flow of automatic temperature calibration and measurement according to aspects of the present disclosure.
Figure 4:
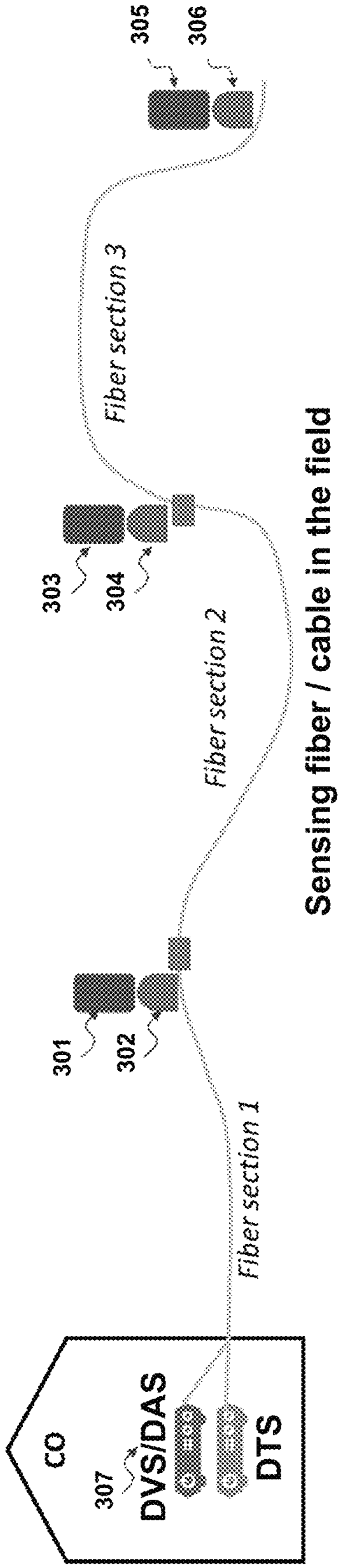
FIG. 4 is a schematic block diagram showing illustrative use of acoustic model for remote temperature calibration for DFOS/DTS according to aspects of the present disclosure.

FIG. 3 is a schematic block diagram showing illustrative operational flow of automatic temperature calibration and measurement according to aspects of the present disclosure.

As generally observed by inspecting this figure, the overall operation begins with determining/obtaining fiber layout information and ends when desired temperature information is determined for the entire length of the optical sensor fiber.

With continued reference now to that FIG. 3, we observe that information relating to the sensing optical fiber/cable is obtained at block 201. This is usually provided by the owner/operator of the fiber optic network as well as an end-user of the temperature measurement system. The sensing optical fiber/cable information generally includes the length, geographical location, and any connection points-such as the fiber optic connectors or splice points along the length of the optical fiber/cable such as 103 in FIG. 2.

We note that as used herein, the term "optical fiber" refers to a single strain of optical fiber, and the term "optical cable" includes the external jacket/protection layer and the optical fiber(s) inside. A commercial optical cable oftentimes contains multiple optical fibers (from 2 to >1000), and these fibers are bundled together inside the optical cable.

With the fiber layout information, the temperature calibration locations [e.g., 110-114] are determined at block 202, two or three for each section, which typically includes the locations slightly before and slightly after each connection point, and at the far end of the fiber route-besides the internal calibration points at the DTS [e.g., 109]-which is not an issue since the temperature information can be obtained easily since it's at the same location as the DTS.

Because it can be assumed that the temperature before and after each connection point is typically the same since they are very close to each other, we only need to measure the actual temperature at the connection point. For example, the temperature values at 110 and 111 can be considered the same, since they are right before and after the connection point 107.

The thermometers [301, 303, 305] are placed at each of the calibration location, along with an acoustic modem transmitter [203, 302, 304, 306]. The thermometer(s) measure(s) the actual/real-time temperature at the placement location, and the temperature measurement is digitized if necessary, and applied to an acoustic modem transmitter which transmits the measurement via DFOS/DVS using vibration/acoustic signals via the optical sensor fiber.

Such an acoustic modem is well-known, and is a unidirectional signal transmission system, having a vibration source mechanically coupled/attached to the optical sensor fiber/cable. It generates mechanical vibration signals which, as will be appreciated by those skilled in the art, can be an acoustic signal, at different frequencies or intensities, which are modulated with the applied signal. At a sensor site, a DFOS vibration sensor, such as a DVS or a DAS, can obtain the vibration information at every location along the fiber, including the location of the vibration source. The obtained vibration information at the vibration source is then demodulated by the interrogator/analyzer to recover the information/data. Due to the continuous DFOS operation, different information at multiple locations can be obtained simultaneously and continuously.

According to aspects of the present disclosure, an acoustic modem transmitter is placed at each calibration location and sends temperature information from a thermometer to the CO at block 205. A DFOS vibration sensor (DVS or DAS) that may include an interrogator/analyzer is placed at the CO 307, which detects the vibration signal at each calibration location. The vibration signal is then demodulated to obtain the temperature information at that calibration location 110-114, at block 206.

The obtained temperature information is used to calibrate the DTS system at block 208, along with the measured Stokes and Anti-Stokes data from the DTS at block 207 and the calibration location information that was set at block 202, using the calibration method and relationship shown and described previously.

After the completion of the calibration process, the C, γ, and Δα parameters for each fiber section can be obtained for the Raman-based DTS. Using these parameters, and the measured Stokes and Anti-Stokes data obtained at step 209, the DTS can determine and provide the temperature information for the entire fiber/cable route at step 210. All of these steps (filed calibration temperature measurement and transmission, temperature demodulation, parameter calculation, and distributed temperature calculation) can be done automatically by the controller/interrogator/analyzer system, without human interaction.

For Brillouin-based DTS and Rayleigh-based DTS, similar steps can be used to obtain the field temperature information needed for calibration, achieving automatic temperature measurement.

Usually, the calibration process is only required periodically, such as once every few days or few hours. The DFOS system interrogator/controller/analyzer can automatically set and perform the calibration on a pre-determined schedule, thus maintaining system measurement accuracy.

Figure 5A:
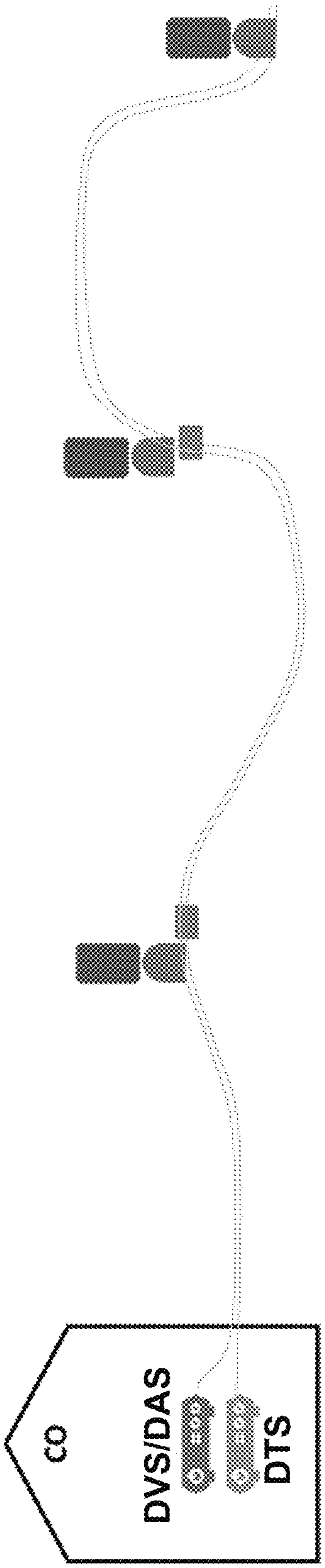
Figure 5B:
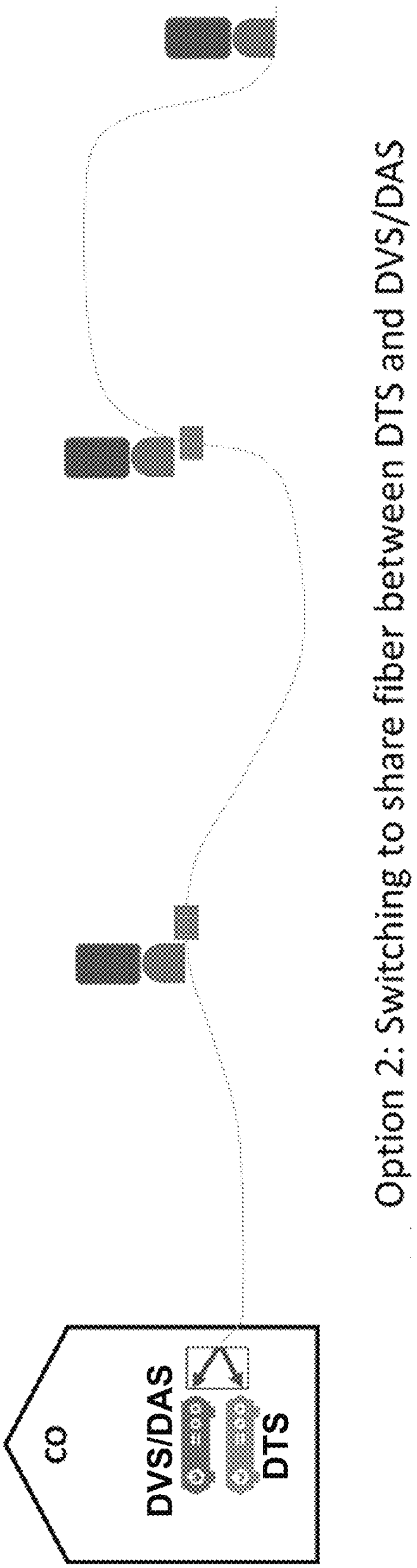
Figure 5C:
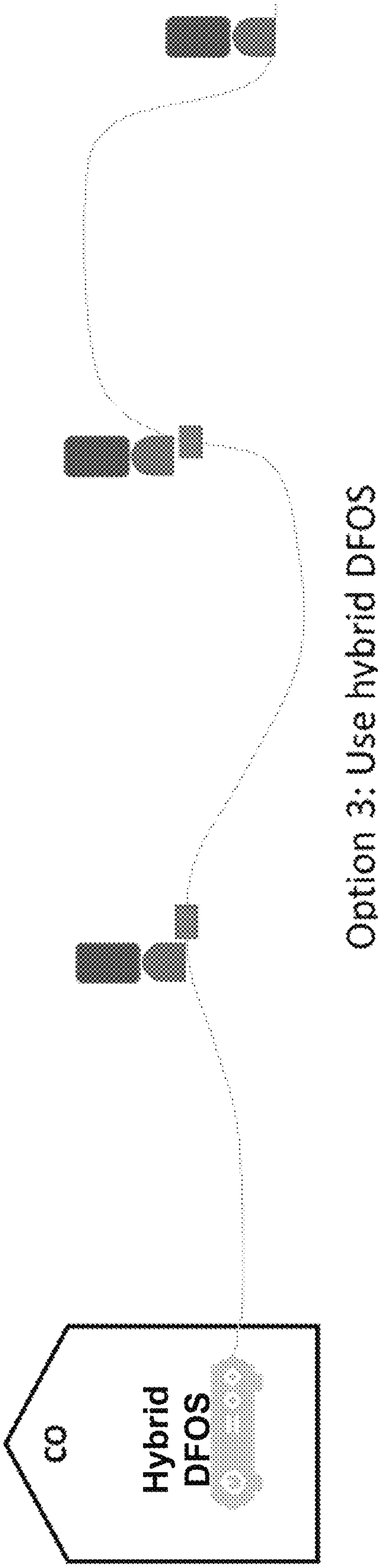

In terms of the configuration to conduct both the vibration sensing (for calibration signal over acoustic modem) and the distributed temperature sensing, there are at least 3 options, as illustrated in FIG. 5(A), FIG. 5(B), and FIG. 5(C) which are schematic block diagrams showing illustrative automatic DFOS/DTS calibration and temperature measurement according to aspects of the present disclosure in which: FIG. 5(A) shows 2 sensors using separate fibers in the same fiber optic cable; FIG. 5(B) shows switching to share fiber between DTS and distributed vibration sensing/distributed acoustic sensing (DVS/DAS); and FIG. 5(C) shows a use of hybrid DFOS; all according to aspects of the present disclosure.

As will be appreciated by those skilled in the art, during the vibration measurement of the vibratory signals introduced by the acoustic modem, the distributed temperature measurement usually cannot be conducted on the same fiber at the same time, because the optical signals for DTS and DVS/DAS usually have different requirements and characteristics. Therefore, a first option is to use two sensing fibers, one for vibration sensing, and the other for temperature sensing. There are usually multiple fibers available in an optical cable, therefore this is typically not an issue. In this option, the calibration temperature information is available constantly.

However, since the calibration process is only performed for a small fraction of overall operational time, the DTS temperature sensing and the DVS/DAS vibration sensing can share the same fiber and operate in an alternating manner. In this configuration, an optical switch may be employed to select either a DTS or DVS/DAS sensor to use the sensor fiber. Most of the time, the DTS uses the fiber for continuous long term temperature measurement. When calibration is needed, the fiber is switched to the DVS/DAS to obtain the acoustic signal from the remote thermometers. Once the temperature information is obtained via DVS/DAS (which is typically very brief), a switch is made to reconnect the sensor fiber to the DTS for Stokes and Anti-Stokes temperature signal measurement. In this option, a controller coordinates the switch and both sensors.

A third option is to conduct distributed temperature and vibration measurement concurrently using the same fiber. This function is available with hybrid DFOS sensors, which determine both temperature and vibration information concurrently using backscatter signals resulting from the same specially designed optical pulses.

Figure 6:
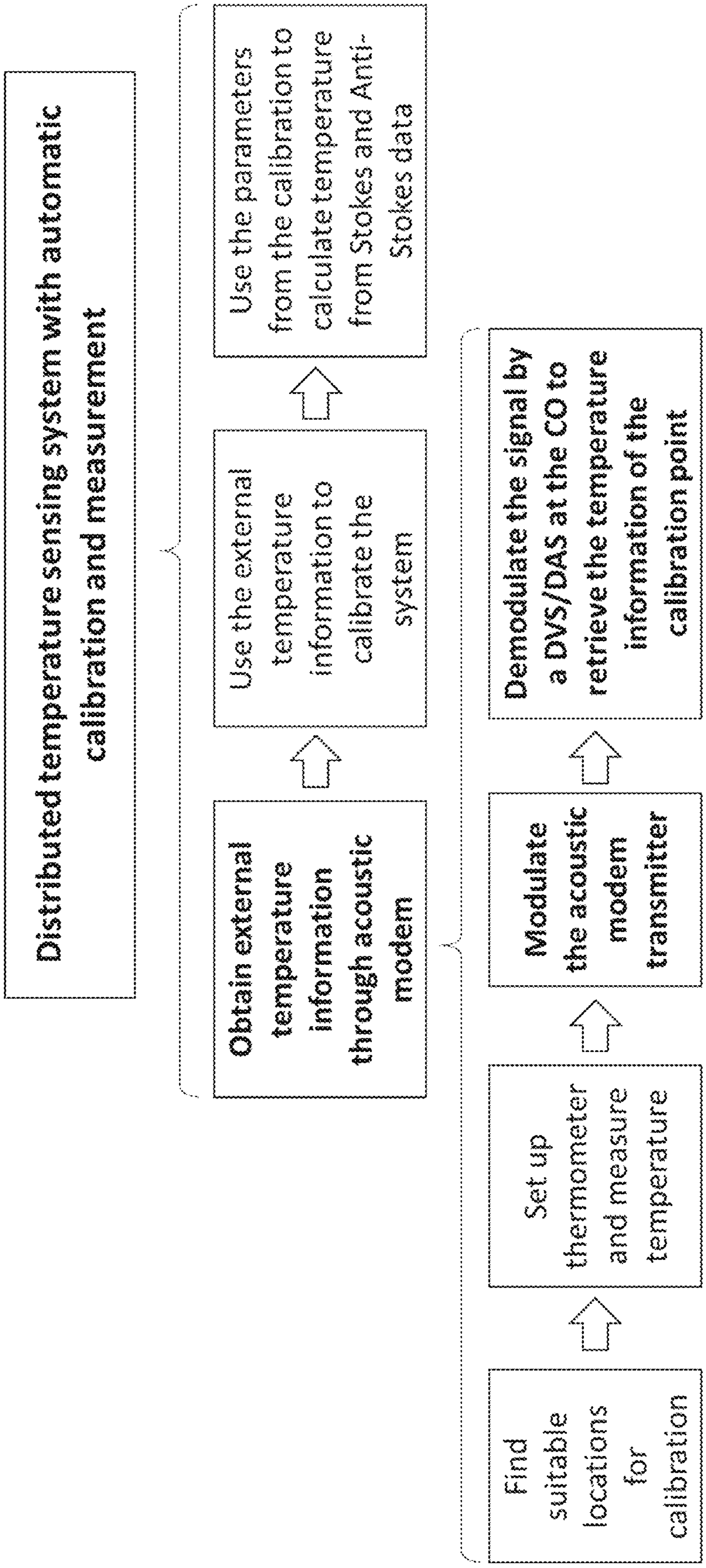
FIG. 6 is a schematic block diagram showing illustrative features of DFOS systems, methods, and structures according to aspects of the present disclosure.

FIG. 6 is a schematic block diagram showing illustrative features of DFOS systems, methods, and structures according to aspects of the present disclosure. As illustratively shown in that figure, a distributed temperature sensing system with automatic calibration and measurement is described. Generally, systems and methods according to the present disclosure obtain external temperature information through the use of an acoustic modem and DFOS/DAS/DVS techniques. Using the external temperature information so obtained, information necessary to calibrate the system is determined. Finally, using parameters obtained from calibration are then used to determine temperatures at points along the length of the optical sensor fiber from Stokes and Anti-Stokes data.

Note that the external temperature information determination is a multi-step process. First, suitable locations for calibration are determined and thermometers or temperature sensors are positioned at those determined locations. The thermometers so located provide temperature measurement data to an acoustic modem transmitter which encodes the temperature measurement data as distributed vibration sensing or distributed acoustic sensing vibrations that are subsequently applied to an optical sensor fiber where they are conveyed back to a DVS/DAS system. The DAS/DVS system may be located at a central office and analyzes the DVS/DAS data to obtain temperatures as measured by the thermometers at the determined locations. The temperatures so obtained are used to calibrate the overall DTS system.

The invention claimed is:

1. An automatic calibration method for distributed fiber optic sensing (DFOS)/distributed temperature sensing (DTS) employing an optical sensor fiber, the method comprising:

operating a distributed fiber optic sensing (DFOS)/distributed vibration sensing (DVS) system to obtain calibration temperatures at a plurality of calibration points along the optical sensor fiber by:

measuring, using a thermometer at each calibration point, a local temperature; applying, by an acoustic modem associated with the thermometer, mechanical vibrations representative of the local temperature to the optical sensor fiber; and demodulating the mechanical vibrations detected by the DVS system to retrieve the local temperature for each calibration point;

operating a DFOS/distributed temperature sensing (DTS) system to obtain DTS temperatures at one or more points along the length of the optical sensor fiber; and calibrating the DTS temperatures obtained from DFOS/DTS using the local temperature retrieved via demodulation of the mechanical vibrations detected by the DVS system.

2. The method of claim 1 wherein each individual one of the plurality of acoustic modems is located at a respective calibration point along the length of the optical sensor fiber.

3. The method of claim 2 wherein the optical sensing fiber comprises a plurality of sections of optical sensor fiber, each section of the optical sensor fiber in optical communication with at least one other section of the optical sensor fiber.

4. The method of claim 3 wherein each section includes at least two calibration points along the optical sensor fiber at which a calibration temperature is measured.

5. The method of claim 4 wherein one of the at least two calibration points of each individual section is located at a beginning the individual section and another one of the at least two calibration points of the individual section is located at the end of the individual section.

6. The method of claim 1 wherein the operating the distributed fiber optic sensing (DFOS)/distributed vibration sensing (DVS) system to obtain calibration temperatures at the plurality of calibration points along the optical sensor fiber is performed periodically.

7. The method of claim 1 wherein the operating the distributed fiber optic sensing (DFOS)/distributed vibration sensing (DVS) system to obtain calibration temperatures at the plurality of calibration points along the optical sensor fiber and the operating the DFOS/distributed temperature sensing (DTS) system to obtain the temperatures at one or more points along the length of the optical sensing fiber are performed concurrently.

8. The method of claim 1 wherein calibration points are located in temperature calibration zones each zone including a plurality of individual calibration points.

9. The method of claim 3 wherein one or more calibration temperatures are obtained from each one of the plurality of sections.

10. The method of claim 1, further comprising:

utilizing an optical switch at a central office location to alternatingly connect the optical sensor fiber between a DVS interrogator and a DTS interrogator;

wherein the mechanical vibrations are detected during a DVS mode of the optical switch, and the DTS temperatures are obtained during a DTS mode of the optical switch.

11. The method of claim 1, wherein the DFOS/DVS system and the DFOS/DTS system comprise a hybrid interrogator that transmits a specially designed optical pulse configured to generate both Raman backscatter for temperature sensing and Rayleigh backscatter for vibration detection concurrently.

12. The method of claim 3, wherein at least one of the plurality of calibration points is located within 1 meter of an optical connector joining two sections of the optical sensor fiber.

* * * * *